(12) United States Patent
Shin et al.

(10) Patent No.: US 7,667,634 B2
(45) Date of Patent: Feb. 23, 2010

(54) ACTIVE RF DECOY SIMULATION APPARATUS

(75) Inventors: Dong Cho Shin, Daejeon-si (KR); Jung Hoon Lee, Daejeon-si (KR)

(73) Assignee: Agency for Defense Development (KR)

( * ) Notice: Subject to any disclaimer, the term of this patent is extended or adjusted under 35 U.S.C. 154(b) by 0 days.

(21) Appl. No.: 12/267,606

(22) Filed: Nov. 9, 2008

(65) Prior Publication Data

US 2009/0128394 A1 May 21, 2009

(30) Foreign Application Priority Data

Nov. 19, 2007 (KR) ...................... 10-2007-0117731

(51) Int. Cl.
*G01S 7/38* (2006.01)
(52) U.S. Cl. ........................................ 342/14; 342/169
(58) Field of Classification Search .................. 342/169, 342/14; 434/5
See application file for complete search history.

(56) References Cited

U.S. PATENT DOCUMENTS

2008/0018525 A1* 1/2008 Svy et al. ..................... 342/169
2009/0128394 A1* 5/2009 Shin et al. ..................... 342/14

FOREIGN PATENT DOCUMENTS

GB 2454982 * 5/2009

OTHER PUBLICATIONS

Tan, Tun-Hou, "Effectiveness Of Off-board Active Decoys Against Anti-shipping Missiles," Masters Thesis, Naval Postgraduate School Monterey California, Sep. 1996.
Sherman Frankel, "Defeating Theater Missile Defense Radars with Active Decoys," Science & Global Security, vol. 6, pp. 333-355, 1997.
August Golden Jr. "Radar Electronic Warfare (AIAA Education Series)," American Institute of Aeronautics and Astronautics, pp. 67-69, 1987.

* cited by examiner

*Primary Examiner*—Dan Pihulic
(74) *Attorney, Agent, or Firm*—Cahn & Samuels, LLP (57) ABSTRACT

RF decoy anti-missile testing in a virtual environment through simulating the aviation of a missile, the reflected signal of a target, and an active RF decoy by use of a target motion simulator which implements the moving trajectory of the RF decoy. The RF decoy radiates a reflected signal of the target and also a deception signal through use of a microwave device that transfers the detected signal from the missile and amplifies the received signal so that a repeated delay signal of the RE decoy greater than that of the reflected signal of the target is radiated by the target motion simulator, thereby testing the deceit performance of the decoy.

6 Claims, 7 Drawing Sheets

Fig. 7

ACTIVE RF DECOY SIMULATION APPARATUS

CROSS-REFERENCE TO RELATED APPLICATIONS

This application claims priority to Republic of Korea application number 10-2007-117731, filed on Nov. 19, 2007, which is hereby incorporated by reference in its entirety.

TECHNICAL FIELD

The present invention relates to an active RF decoy simulation apparatus which can be used for ship-borne electronic warfare (EW) system. In the present invention, the simulation system is separated from the platform and the system can be operated inside a simulation chamber.

BACKGROUND ART

Conventional jamming device is mounted on the platform and uses two antennas moving in the same way in the target motion simulator (TMS). For analysis of jamming effectiveness, one antenna radiates the reflected signal of target ship and the other antenna radiates the jamming signal and analyzes the jamming effect.

These systems, however, impose difficulty in simulating the system separated from the platform like the active RF decoy, a ship on the sea and relative distance of the active RF decoy simulation apparatus.

SUMMARY OF THE INVENTION

Disclosed is an active RF decoy simulation apparatus for simulating an active RF decoy system in virtual environment, comprising: a missile seeker which radiates RF signals and detects reflection signals from the target ship, a target motion simulator for implementing the moving trajectory of active RF decoy, in which an antenna for radiating the reflected signal of the target ship and another antenna for radiating the deception signal of the active RF decoy according to the transmitted missile signal are mounted, a microwave device which transfers the detected signal radiated from the missile to the antenna so that the reflected signal of the target ship is radiated by the target motion simulator and which receives the signal radiated from the missile, amplifies the received signal and transfers the signal to the antenna so that a repeated delay signal of the RF decoy simulator which is greater than the reflected signal of the target ship is radiated by the target motion simulator, a missile seeker control device which controls the missile seeker, a target motion simulator control device which controls the target motion simulator, and a virtual environment simulation device which controls the microwave device which controls the radiation of the signal of the RF decoy simulator, and the missile seeker control device.

OBJECT OF THE INVENTION

The present invention has been designed to solve the above problem of conventional systems and provides an active RF decoy simulation apparatus as solution of above problem. It simulates the trajectory and radar signals of active RF decoy, ship and missile using the 3-dimension to 2-dimension mapping and scaling methods, similar to real EW naval environment, when the ship receives the missile seeker signal after anti-ship missile tracking.

DISCLOSURE

In order to achieve the above object of the invention, the present invention provides an active RF decoy simulation apparatus for simulating an active RF decoy in virtual environment, comprising a missile seeker which radiates RF signals and detects reflection signals from the target ship, a target motion simulator for implementing the moving trajectory of active RF decoy, in which an antenna for radiating the reflected signal of the target ship and another antenna for radiating the deception signal of the active RF decoy according to the transmitted missile signal are mounted, a microwave device which transfers the detected signal radiated from the missile to the antenna so that the reflected signal of the target ship is radiated by the target motion simulator and which receives the signal radiated from the missile, amplifies the received signal and transfers the signal to the antenna so that a repeated delay signal of the RF decoy which is greater than the reflected signal of the target ship is radiated by the target motion simulator, a missile seeker control device which controls the missile seeker, a target motion simulator control device which controls the target motion simulator; and a virtual environment simulation device which controls the microwave device which controls the radiation of the signal of the RF decoy, and the missile seeker control device.

Another aspect of the present invention is to provide an active RF decoy simulation apparatus further comprising a computer system by which the target motion simulation is controlled by a user through computer display.

Yet another aspect of the present invention is to provide an active RF decoy simulation apparatus wherein the target motion simulator is constructed to move the antenna of the active RF decoy away from the antenna of the target ship along the motion trajectory when detecting the signal from the missile.

According to another aspect of the present invention, in the active RF decoy simulation apparatus of the present invention, the repeat delay signal radiated from the antenna of the active RF decoy is determined by the formula:

$$J = 4\Pi \frac{ERP_J \cdot R_J^2}{ERP_R \cdot \sigma_T} \cdot S,$$

where
J is the repeated delay signal radiated from the active RF decoy,
S is the reflected signal of the target ship,
$ERP_J$ is the effective radiation power of the active RF decoy,
$ERP_R$ is the effective radiation power of the missile,
$\sigma_T$ is the RCS (reaction control system) of the target ship, and
$R_J$ is distance between active RF decoy and missile seeker.

According to yet another aspect of the present invention, in the active RF decoy simulation apparatus of the present invention, the motion trajectory of the active RF decoy is determined by changing the mapping and scaling of the target trap, active RF decoy and the distance to the missile seeker according to the equation:

$$\theta = \cos^{-1}\left(\frac{C^2 + A^2 - B^2}{2C \cdot A}\right),$$

(θ: The difference angle of target ship and active RF decoy from missile
A: Distance of missile seeker and target ship
C: Distance of missile seeker and active RF decoy
B: Distance of target ship and active RF decoy)

$$X = C \times \sin(\theta),$$

(X: Distance of perpendicular line at active RF decoy to virtual line between target ship and missile seeker)

$$X' = A \times \tan(\theta),$$

(X': Distance of perpendicular line at virtual line of missile and active RF decoy to target ship).

EFFECT OF THE INVENTION

By using the active RF decoy simulation apparatus of the present invention, electric warfare can be simulated in the room by simulating the aviation of the threatening missile and an active RF decoy simulation apparatus. The present invention has the effect of simulating electric warfare of ships under various environments and can reduce the cost of simulation through repetitive experiment.

DETAILED DESCRIPTION OF THE INVENTION

The present invention will be described with reference to the drawings attached.

Figure 1:
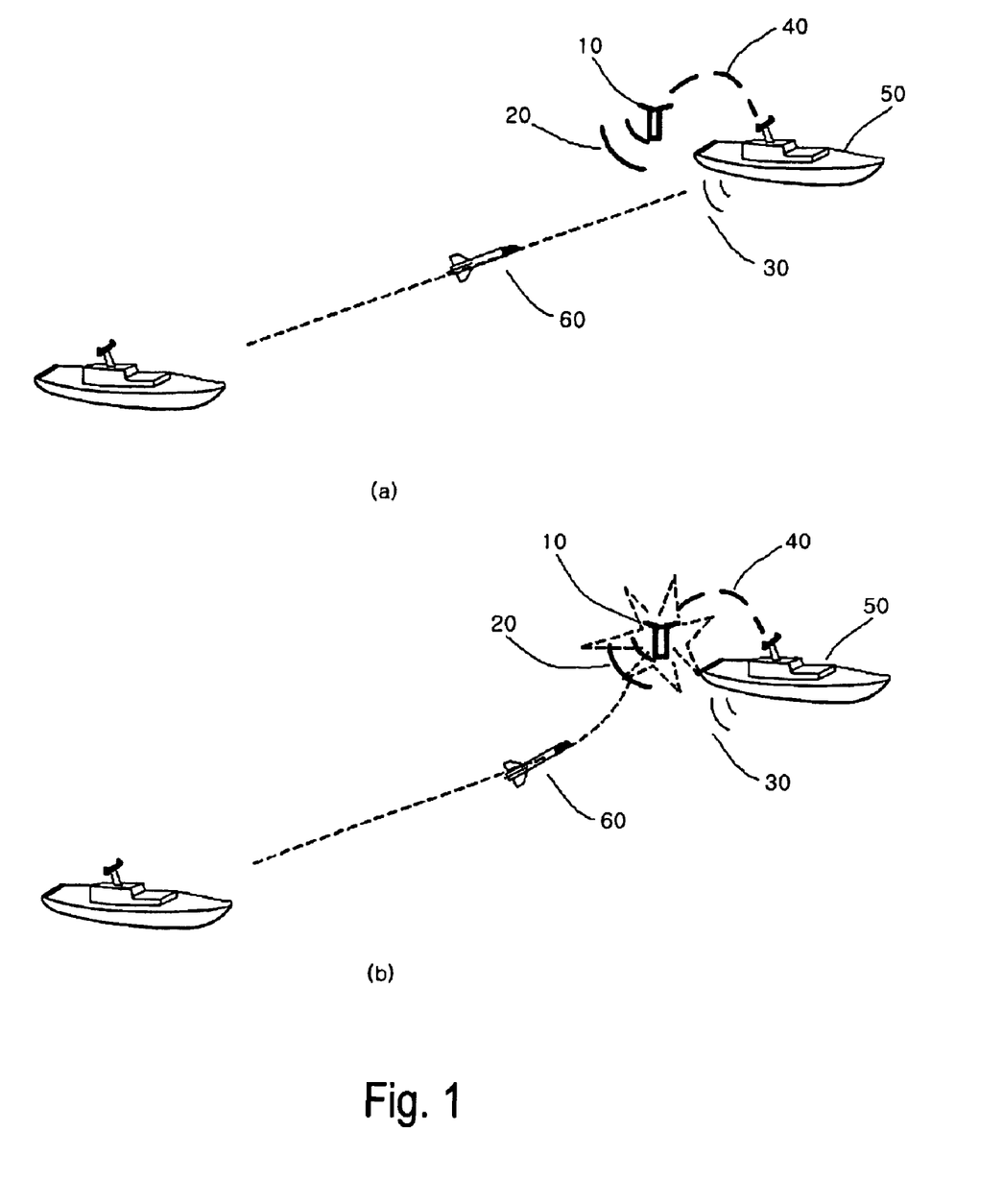
FIG. 1 shows general operational concept of active RF decoy in real environment.

FIG. 1 shows general operational concept of active RF decoy in real EW naval environment.

The missile (60) is launched to the target ship (50), then the ship (50) launch the active RF decoy (10) with the trajectory path (40). This active RF decoy (10) radiates more powerful signal (20) to jamming missile seeker signal than reflected signal (30) of target ship (50). So the ship (50) protected from the missile (60) attack, because missile (60) seeker trace more powerful signal source (10) as illustrated by FIG. 1(b).

Figure 2A:
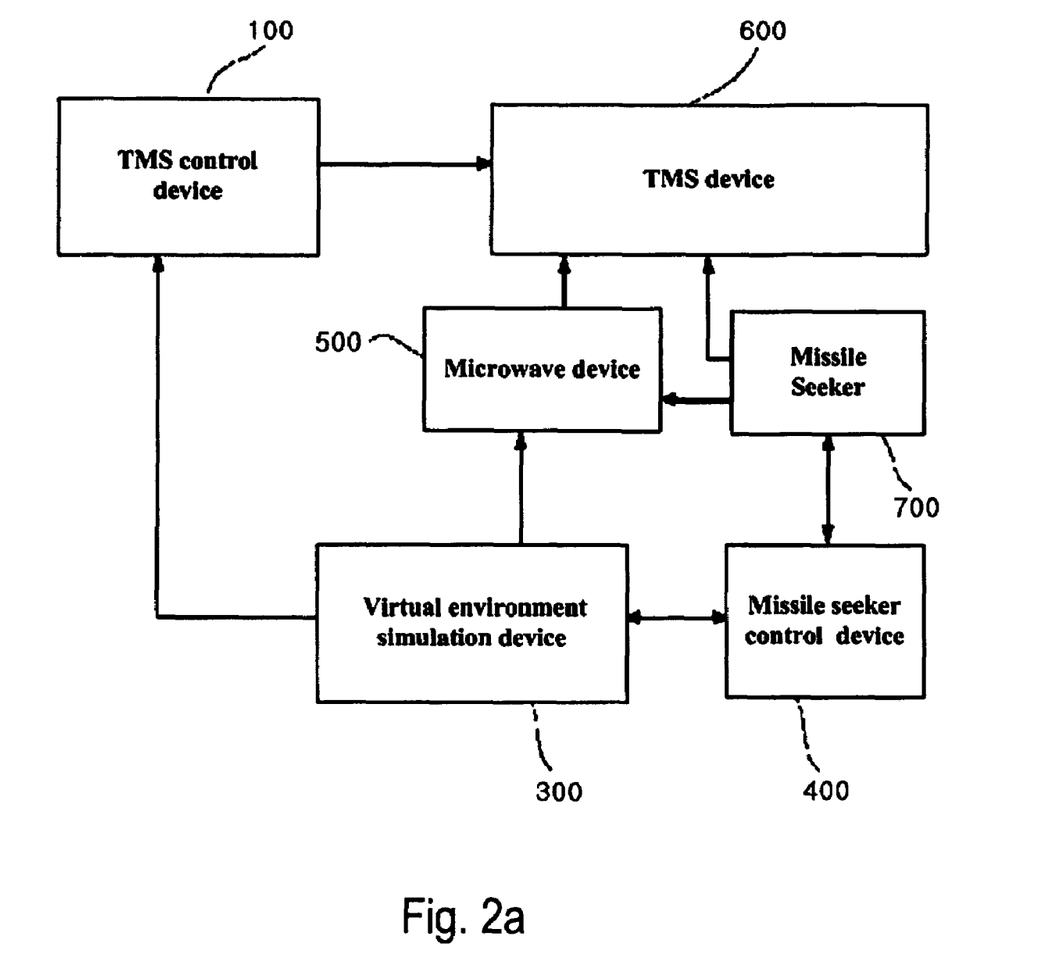
FIG. 2a is a block diagram of an active RF decoy simulator according to one example of the present invention.
Figure 2B:
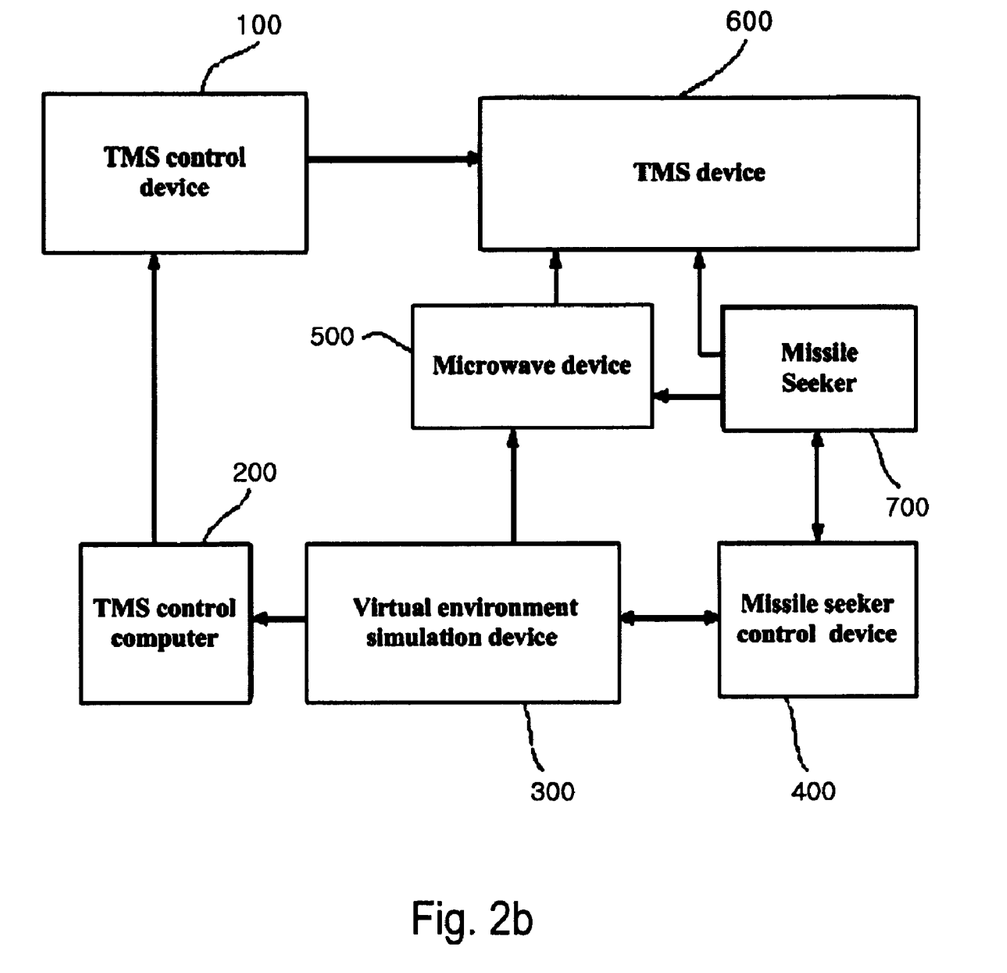
FIG. 2b is a block diagram of an active RF decoy simulator according to another example of the present invention.

FIG. 2a and FIG. 2b is a block diagram showing active RF decoy simulation apparatus in accordance with the invention.

FIG. 2a shows active RF decoy simulation apparatus to simulate active RF decoy simulation in virtual environment in accordance with the invention consists of following parts:

The missile seeker (700) radiate the RF signal and then detects the reflection signal of the target ship. According to the signal radiated in missile, TMS (Target Motion Simulator) (600) have two antennas to radiate both the reflected signal of the target ship and the deception signal of the active RF decoy and implements the moving trajectory of active RF decoy. When missile seeker detected the target reflected signal synchronized with the transmitted signal in missile seeker, the microwave device (500) transfers not only the target reflected signal to antenna in charge of the signal transmission of the target ship in order to radiate the target reflected signal but also active RF decoy signal to antenna in charge of the signal transmission of the active RF decoy in order to radiate the signal, which is amplified and delayed, more than the target reflected signal.

The missile seeker control device (400) controls the missile seeker (700).

The TMS control device (100) controls TMS (600).

The virtual environment simulation device (300) controls the missile seeker control device (400) and the microwave device (500).

Also, the invention includes the TMS control computer (200) so that the user can control the TMS throughout the computer display as illustrated in FIG. 2b.

Figure 3:
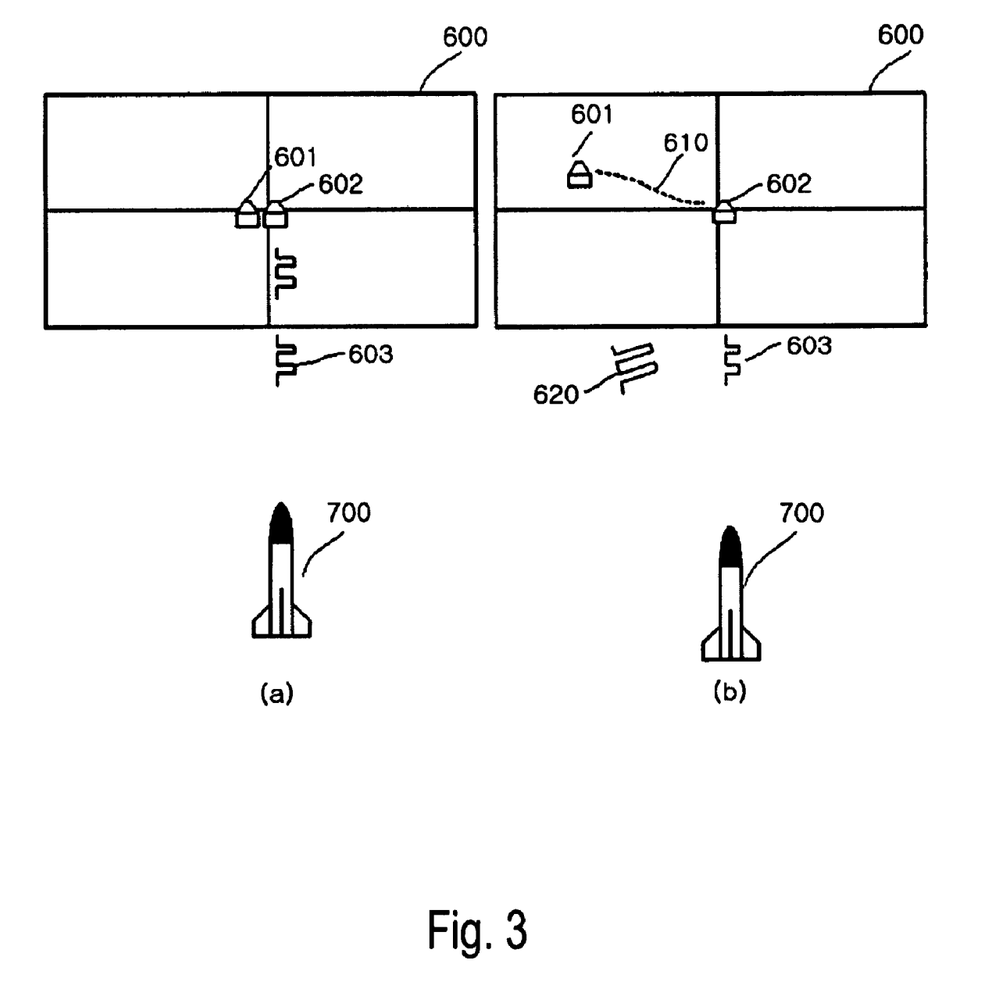
FIG. 3 illustrates the target motion simulator for the active RF decoy simulator of the present invention.

FIG. 3 is a diagram showing an embodiment of the target moving simulation by active RF decoy simulation system (602) in accordance with the invention.

FIG. 3(a) is a diagram showing antenna radiated the signal of the target ship in TMS (600) and antenna (601) radiated the signal of the active RF decoy.

FIG. 3(a) shows there are active RF decoy and the ship at the same position.

The missile seeker (700) radiated itself signal and then detected the return signal that is the reflected signal of the target ship.

When TMS control (600) detects the threat signal radiated from the missile.

Active RF decoy antenna (601) like in FIG. 3(b) moves according to trajectory (610).

In virtual environment simulation device, Antenna (601) moves according to trajectory (610) and radiates the signal (620) of the Active RF decoy.

Using equation[1], it also radiates the repeated delayed signal which is bigger than the reflected signal (603) radiated from the target ship.

$$J = 4\Pi \frac{ERP_J \cdot R_J^2}{ERP_R \cdot \sigma_T} \cdot S \qquad \text{Equation [1]}$$

where
J is the repeated delay signal radiated from the active RF decoy,
S is the reflected signal of the target ship,
$ERP_J$ is the effective radiation power of the active RF decoy,
$ERP_R$ is the effective radiation power of the missile,
$\sigma_T$ is the RCS (reaction control system) of the target ship, and
$R_J$ is distance between active RF decoy and missile seeker.

Figure 4:
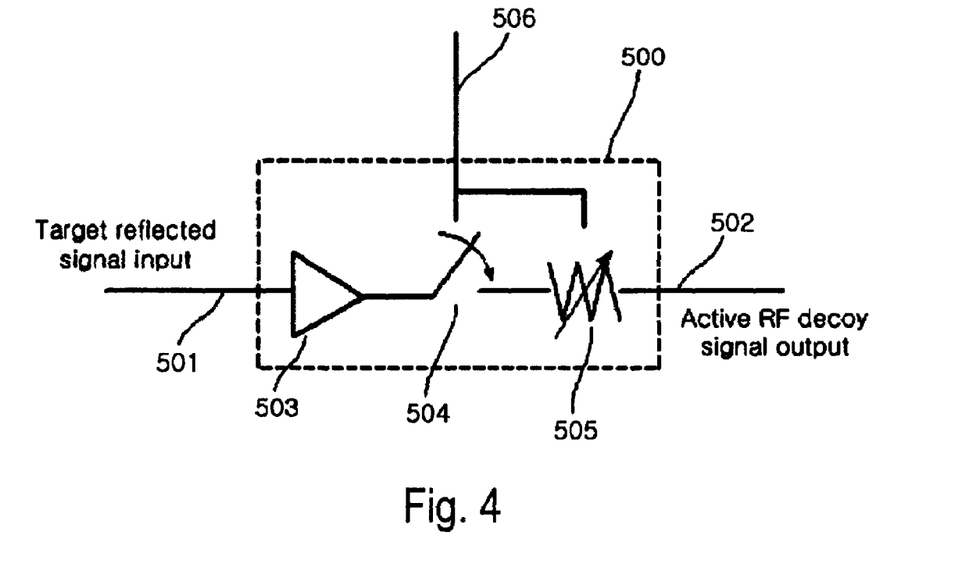
FIG. 4 is a diagram illustrating the construction of the microwave device for the active RF decoy simulator of the present invention.

FIG. 4 is simplified block diagram showing the microwave device composition of Active RF decoy simulation apparatus in accordance with the invention.

The microwave device (500) consist of following parts.

The amplifier (503) amplifies the target reflected signal (501) inputted from the missile seeker (700).

The RF switch unit (504) turns on active RF decoy signal when active RF decoy antenna moves the trajectory after active RF decoy antenna separates from the target ship.

The attenuator (505) reduces the signal.

The microwave control signal line (506) in connection with a 3-dimension virtual environment simulation device (FIG. 2. 300) governs the output of the active RF decoy signal (502) through the amplifier (503), RF switch unit (504) and attenuator (505).

Figure 5:
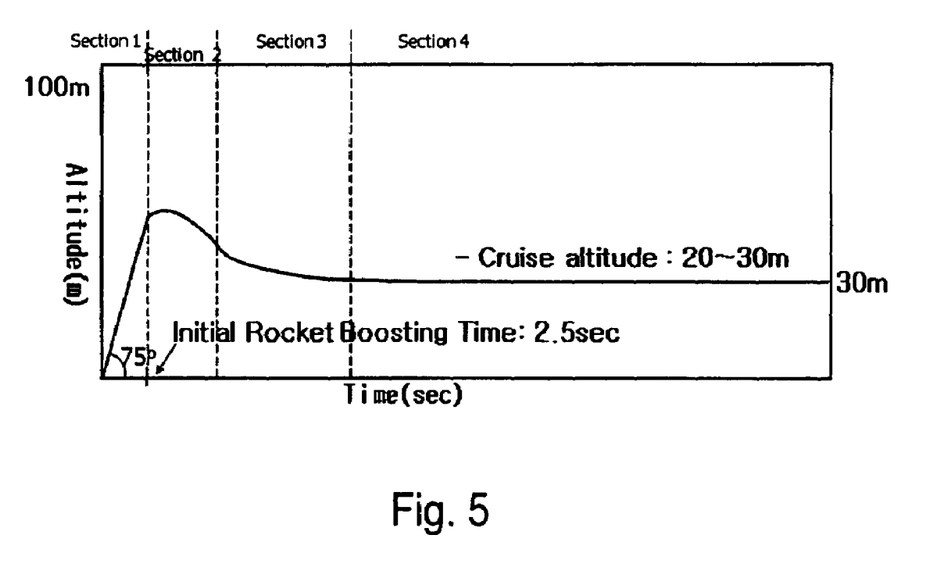
FIG. 5 is a simulated motion graph of the active RF decoy simulation apparatus of the present invention.

FIG. 5 shows simulated motion graph of active RF decoy to generate its trajectory (610) at FIG. 3(b). This trajectory generates from section 1 to 4 in 3 dimensional space. The section 1 applies in two steps as in the following:

Step 1: Active RF decoy rotates with initial its yaw, pitch and roll like equation 2.

$$G' = G \begin{bmatrix} \cos\theta_y, 0, -\sin\theta_y, 0 \\ 0,1,0,0 \\ \sin\theta_y, 0,\cos\theta_y, 0 \\ 0,0,0,1 \end{bmatrix},$$

$$G'' = G' \begin{bmatrix} \cos\theta_p, \sin\theta_p, 0, 0 \\ -\sin\theta_p, \cos\theta_p, 0,0 \\ 0,0,1,0 \\ 0,0,0,1 \end{bmatrix},$$

$$G''' = G'' \begin{bmatrix} 1,0,0,0 \\ 0, \cos\theta_\gamma, \sin\theta_\gamma, 0, \\ 0, -\sin\theta_\gamma \cos\theta_\gamma, 0 \\ 0,0,0,1 \end{bmatrix},$$

$$G = \begin{bmatrix} 1, & 0, & 0, & 0 \\ 1, & 0, & 0, & 0 \\ 0, & 0, & 1, & 0 \\ 0, & 0, & 0, & 1 \end{bmatrix}$$

[Equation 2]

(Where, G: 4*4 matrix θy, θp, θr: Angle of yaw, pitch and roll G', G", G"': Matrix)

Step 2: Active RF decoy moves with its position matrix like equation 3.

$$V_a = g \times \Delta t,$$

$$P_{La} = \begin{bmatrix} V_a \times t \\ 0 \\ 0 \end{bmatrix},$$

$$P_{Ta} = G''' \cdot P_{La},$$

$$P_a = P_a + P_{Ta},$$

$$G'''' = \begin{bmatrix} G'''_{1,4} + P_{a\_x} \\ G'''_{2,4} + P_{a\_y} \\ G'''_{3,4} + P_{a\_z} \end{bmatrix}$$

[Equation 3]

(Where, g: Acceleration of gravity
Va: Velocity of active RF decoy
Δt: Moving time of active RF decoy
PLa: Moving distance of active RF decoy
PTa: Rotated moving distance of active RF decoy
Pa: Moving position of active RF decoy
G"": Final position matrix of active RF decoy)

In section 2, the active RF decoy moves with a parabolic free falling down motion like equation 4.

$$x = v_0 \cos\theta \cdot \Delta t$$

[Equation 4]

-continued $$y = v_0 \sin\theta \cdot \Delta t - \frac{1}{2} g \Delta t^2$$

(Where, θ: Launching angle of active RF decoy
x: horizontal position of active RF decoy
y: Vertical position of active RF decoy
Δt: Moving time of active RF decoy
g: Acceleration of gravity)

In section 3, the active RF decoy slows down to target altitude (Section 4).

In section 4, the active RF decoy cruises flight similar to ship's velocity.

Figure 6:
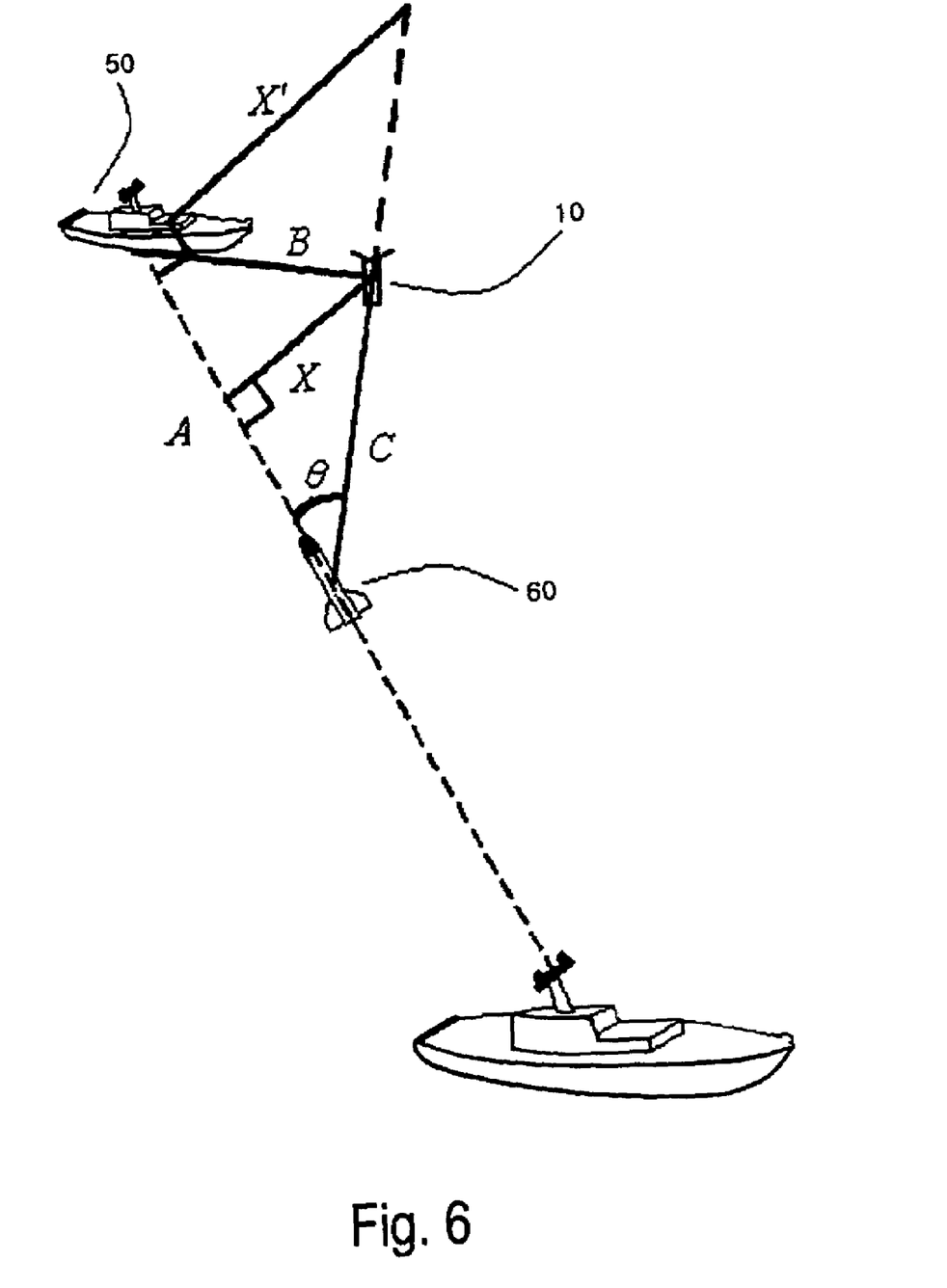
FIG. 6 shows the functional relation between the target ship, an active RF decoy, distance of missile and the angle.

FIG. 6 shows the mapping and scaling illustration for trajectory of active RF decoy, ship and missile. The trajectory is converted 3 Dimensional space into 2 Dimensional plane with equation 5 for target motion simulator of EW engagement anechoic chamber.

$$\theta = \cos^{-1}\left(\frac{C^2 + A^2 - B^2}{2C \cdot A}\right),$$

$$X = C \times \sin(\theta),$$

$$X' = A \times \tan(\theta)$$

[Equation 5]

(Where, θ: The difference angle of target ship and active RF decoy from missile
A: Distance of missile and target ship
C: Distance of missile and active RF decoy
B: Distance of target ship and active RF decoy
X: Distance of perpendicular line at active RF decoy to virtual line of target ship and missile
X': Distance of perpendicular line at virtual line of missile and active RF decoy to target ship)

Figure 7:
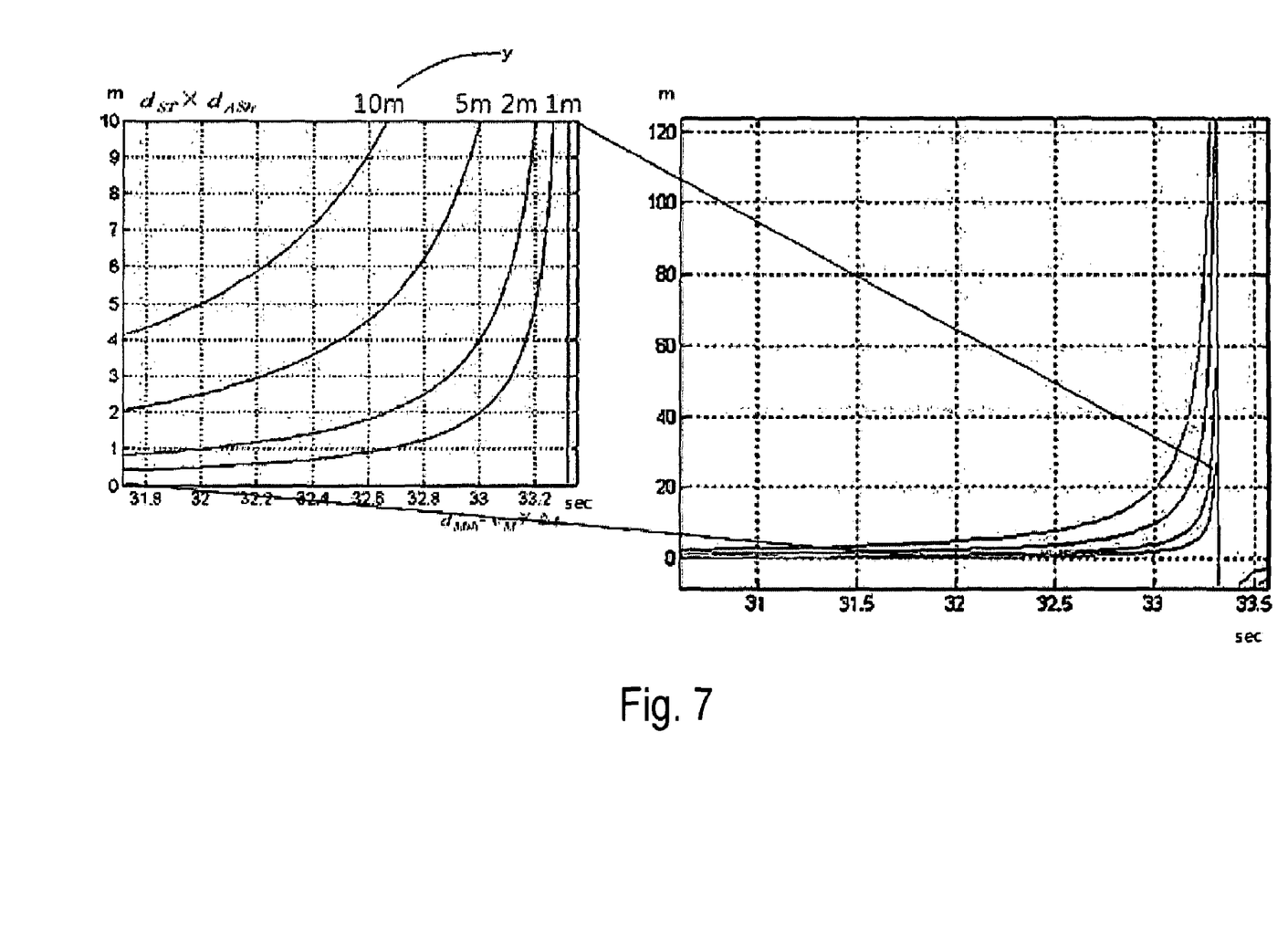
FIG. 7 is an analysis graph of the position of the missile for mapping into the active RF decoy simulation apparatus of the present invention.

FIG. 7 shows missile seeker position analysis graph for mapping and scaling of our simulation in EW engagement anechoic chamber. This graph illustrates the best adequate position of missile seeker for mapping and scaling of active RF decoy's trajectory in 3 Dimensional space to 2 Dimensional target motion simulator using equation 6.

$$y = \frac{d_{ST} \times d_{ASh}}{d_{MSh} - v_M \times \Delta t}$$

[Equation 6]

(Where, y: Distance of a antenna for active RF decoy's signal and a antenna for the target ship's signal in EW engagement anechoic chamber
$d_{ST}$: Distance of the missile seeker and the target motion simulator in EW engagement anechoic chamber
$d_{ASh}$: Distance of the active RF decoy and the target ship in the scenario of 3D virtual space
$d_{MSh}$: Distance of the missile seeker and the target ship in scenario of 3D virtual space
Δt: Missile Moving time
$V_M$: Missile Velocity)

As the above graph, if it is very short the distance (y) of the missile seeker and the target motion simulator in EW engagement anechoic chamber, then the target motion simulator can not response because the moving velocity is more fast than maximum speed (3.5 m/sec) of target motion simulator, when the missile approach gradually to the target ship. If it is very long the distance (y) of the missile seeker and the target motion simulator in EW engagement anechoic chamber, then the target motion simulator cannot also respond because the missile approaches gradually to the target ship. So, we set the distance of the missile seeker and the target motion simulator to 5 m in EW engagement anechoic chamber.

The present invention has been described with preferable examples which just illustrate aspects of the present invention. The example should be acknowledged not to limit the present invention and can be modified as needed.

⟨DESCRIPTION OF THE NUMERALS IN THE DRAWINGS⟩

10: Active RF decoy
40: Moving trajectory of the active RF decoy
50: Target ship
60: Missile
100: Controller of the target motion simulator
200: Computer for controlling the target motion simulator
300: Virtual environment simulation apparatus
400: Controller of the missile seeker
500: Microwave device
600: Target motion simulator
700: Missile seeker

What is claimed is:

1. An active RF decoy simulation apparatus for simulating an active RF decoy in virtual environment, comprising:
   a missile seeker which radiates RF signals and detects reflection signals from the target ship;
   a target motion simulator for implementing the moving trajectory of active RF decoy, in which an antenna for radiating the reflected signal of the target ship and another antenna for radiating the deception signal of the active RF decoy according to the transmitted missile signal are mounted;
   a microwave device which transfers the detected signal radiated from the missile to the antenna so that the reflected signal of the target ship is radiated by the target motion simulator and which receives the signal radiated from the missile, amplifies the received signal and transfers the signal to the antenna so that a repeated delay signal of the RF decoy simulator which is greater than the reflected signal of the target ship is radiated by the target motion simulator;
   a missile seeker control device which controls the missile seeker;
   a target motion simulator control device which controls the target motion simulator; and
   a virtual environment simulation device which controls the microwave device which controls the radiation of the signal of the RF decoy, and the missile seeker control device.

2. The active RF decoy simulation apparatus according to claim 1, further comprising a computer system by which the target motion simulation is controlled by a user through computer display.

3. The active RF decoy simulation apparatus according to claim 1, wherein the target motion simulator is constructed to move the antenna of the active RF decoy away from the antenna of the target ship along the motion trajectory when detecting the signal radiated from the missile.

4. The active RF decoy simulation apparatus according to claim 2, wherein the target motion simulator is constructed to move the antenna of the active RF decoy away from the antenna of the target ship along the motion trajectory when detecting the signal radiated from the missile.

5. The active RF decoy simulation apparatus according to claim 1, wherein the repeat delay signal radiated from the antenna of the active RF decoy is determined by the formula:

$$J = 4\Pi \frac{ERP_J \cdot R_J^2}{ERP_R \cdot \sigma_T} \cdot S$$

where

J is the repeated delay signal radiated from the active RF decoy,
S is the reflected signal of the target ship,
$ERP_J$ is the effective radiation power of the active RF decoy,
$ERP_R$ is the effective radiation power of the missile,
$\sigma_T$ is the RCS (reaction control system) of the target ship, and
$R_J$ is distance between active RF decoy and missile seeker.

6. The active RF decoy simulation apparatus according to claim 1, wherein the motion trajectory of the active RF decoy is determined by modifying the variables according to the equation:

$$\theta = \cos^{-1}\left(\frac{C^2 + A^2 - B^2}{2C \cdot A}\right),$$

(θ: The difference angle of target ship and active RF decoy from missile
A: Distance of missile and target ship
C: Distance of missile and active RF decoy
B: Distance of target ship and active RF decoy)

$X = C \times \sin(\theta),$ (X: Distance of perpendicular line at active RF decoy to virtual line of target ship and missile)

$X' = A \times \tan(\theta),$ (X': Distance of perpendicular line at virtual line of missile and active RF decoy to target ship).

* * * * *